Figure 1:
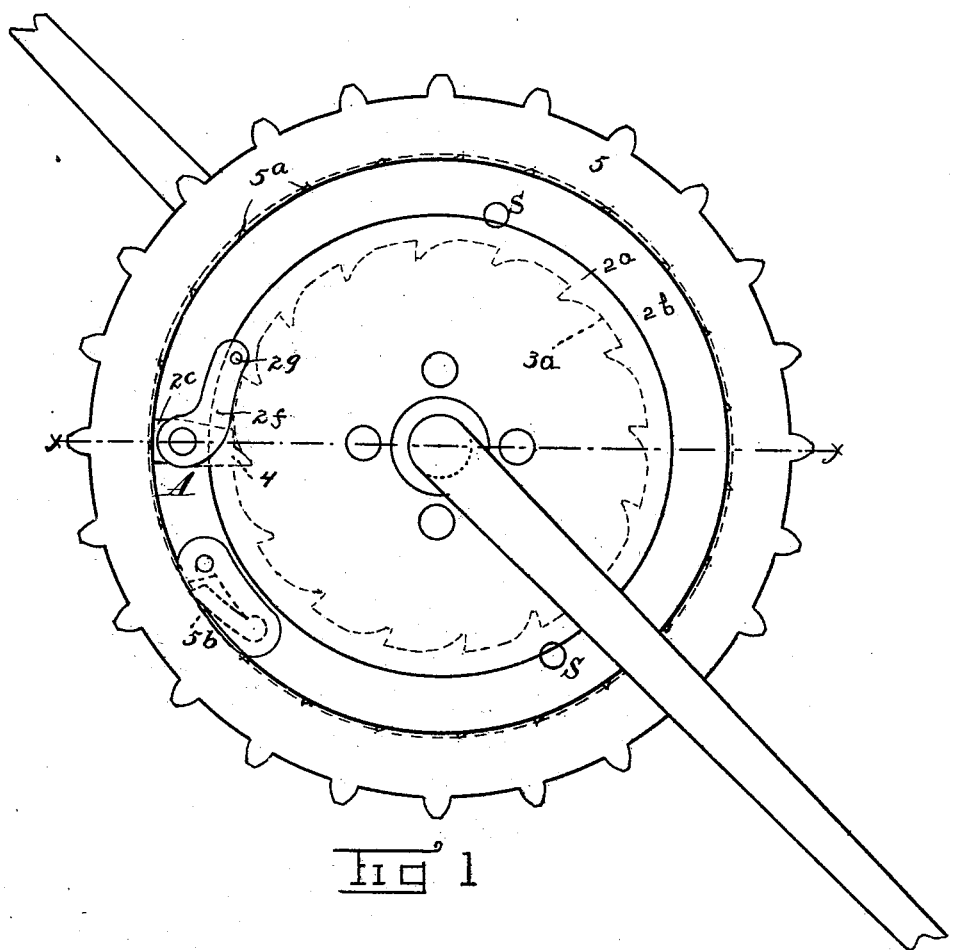

No. 636,045. Patented Oct. 31, 1899.
J. D. JACKSON.
BACK PEDALING BRAKE.
(Application filed June 5, 1899.)

(No Model.) 3 Sheets—Sheet 1.

WITNESSES
Chas. E. Wisner
May E. Kott

INVENTOR
John D Jackson
By Parker & Burton
Attorneys.

No. 636,045. Patented Oct. 31, 1899.
J. D. JACKSON.
BACK PEDALING BRAKE.
(Application filed June 5, 1899.)
(No Model.) 3 Sheets—Sheet 2.
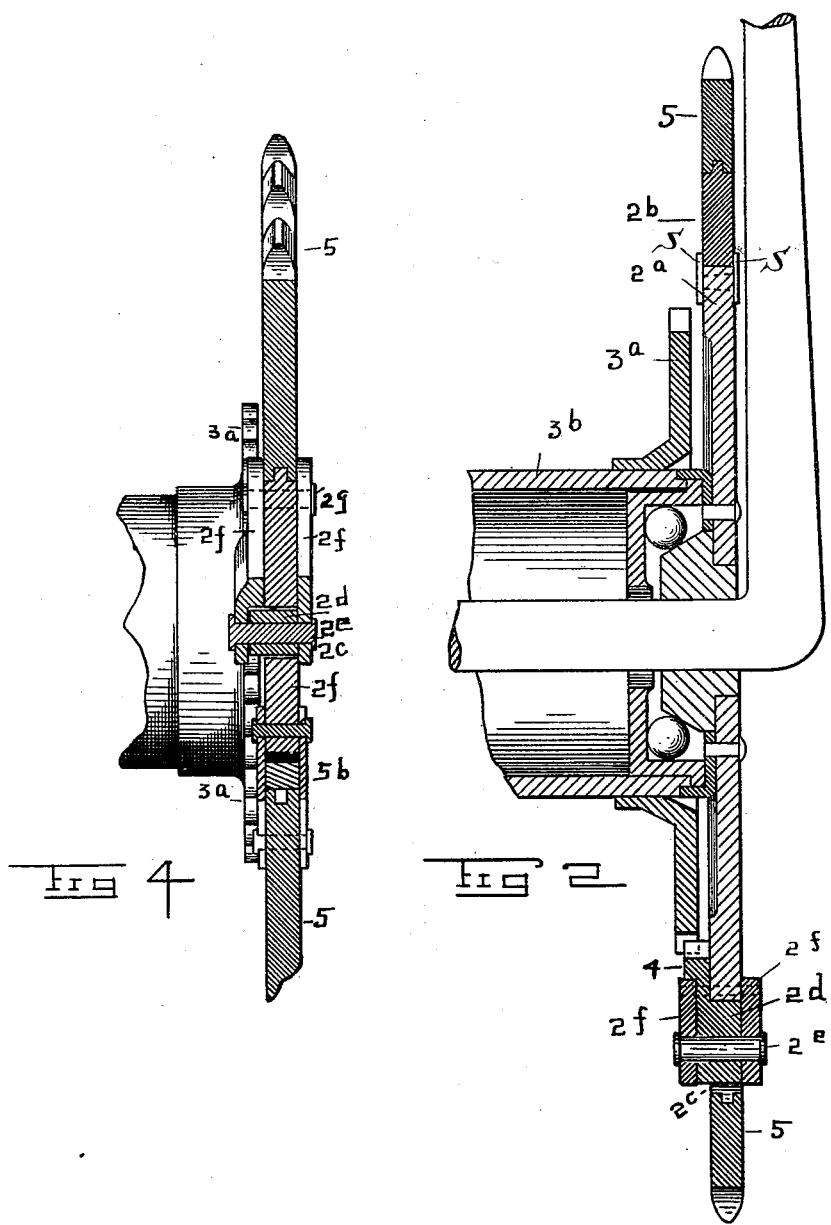
WITNESSES
Chas. E. Wiener
M. E. Kott.
INVENTOR
John D. Jackson
By Parker & Burton
Attorneys.

No. 636,045. Patented Oct. 31, 1899.
J. D. JACKSON.
BACK PEDALING BRAKE.
(Application filed June 5, 1899.)
(No Model.) 3 Sheets—Sheet 3.
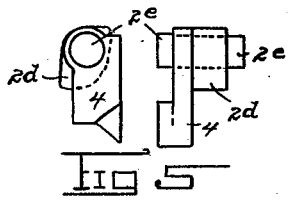
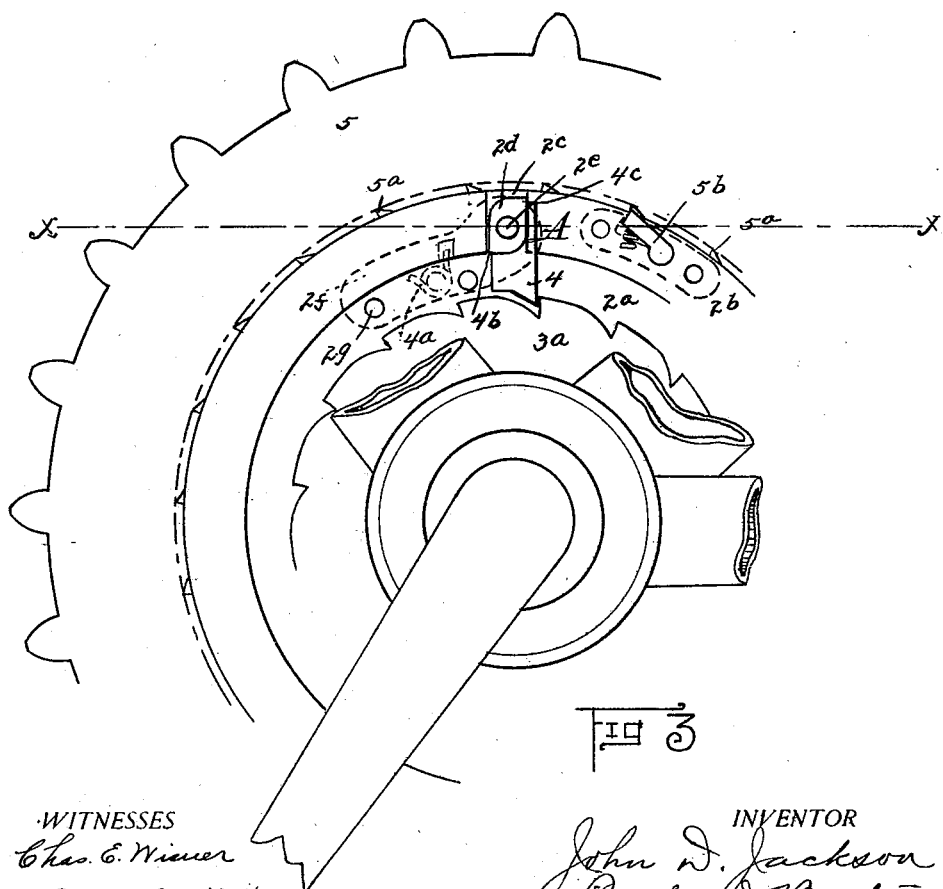
WITNESSES
INVENTOR

UNITED STATES PATENT OFFICE.

JOHN D. JACKSON, OF DETROIT, MICHIGAN.

BACK-PEDALING BRAKE.

SPECIFICATION forming part of Letters Patent No. 636,045, dated October 31, 1899.

Application filed June 5, 1899. Serial No. 719,376. (No model.)

*To all whom it may concern:*

Be it known that I, JOHN D. JACKSON, a citizen of the United States, residing at Detroit, county of Wayne, State of Michigan, have invented a certain new and useful Improvement in Coasters and Brakes; and I declare the following to be a full, clear, and exact description of the invention, such as will enable others skilled in the art to which it pertains to make and use the same, reference being had to the accompanying drawings, which form a part of this specification.

This invention relates to bicycles, and has for its object an improved attachment by which the driving mechanism is adapted to act in the usual way or to permit of a free forward movement of the bicycle when the pedals remain at rest or to brake the bicycle when the pedals are given a reverse motion.

In the drawings, Figure 1 is a side elevation of the attachment in place. Fig. 2 is a section on the line $xx$ in Fig. 1. Fig. 3 is a side elevation showing the side of the attachment which is toward the bicycle-frame. Fig. 4 is a section through the line $xx$ of Fig. 3. Fig. 5 is a side and an end elevation of the dog 4.

$3^a$ is a circular disk immovably secured to the hanger $3^b$ of the bicycle-frame and provided with ratchet-teeth around its periphery adapted to oppose the motion of a pawl in a reverse direction relative to that of the cranks in driving the bicycle forward. On the crank-shaft, and fast to it, is a disk or plate $2^a$, lying in a plane parallel and adjacent to that of the disk $3^a$.

$2^b$ is a split ring surrounding the disk $2^a$ and adapted to turn slightly thereon.

S S are bolts the heads or nuts of which act to retain the ring $2^b$ and disk $2^a$ in their relative positions. Said ring is cut through, leaving a small space (indicated by the reference-figure $2^c$) between its two ends. Between the ends of the ring $2^b$ in the space $2^c$ is located a block $2^d$ by trunnions $2^e$ between the ends of links $2^f$, which links are secured near their other ends to the disk $2^a$ by a pin $2^g$. The links $2^f$ coact with the bolts S S to secure the split ring $2^b$ upon the disk $2^a$.

The block $2^d$ is larger in the plane of the ring $2^b$ at the bottom than at the top of Fig. 3. This shape is, however, merely relative to the space $2^c$ between the ends of the split ring $2^b$, and it will be as well to make said space narrower at the inner than at the outer end.

4 is a pawl or dog integral with the block $2^d$ and extending radially toward the crank-shaft to engage the teeth in the periphery of the disk $3^a$.

The sprocket-wheel 5 is a ring secured so as to be capable of revolving upon the split ring $2^b$ and is provided with a groove around its inner edge, into which a tongue from the periphery of the split ring $2^b$ projects. The inner edge of the sprocket-wheel 5 is notched at intervals with angular notches $5^a$, and a spring-pawl $5^b$ engages in these notches, so as to prevent a movement of said ring relative to said sprocket-wheel in a direction corresponding to the forward movement of the bicycle, but to permit such relative motion in the other direction. Said spring-pawl is pivoted in a slot in the periphery of the split ring $2^b$ and is urged with a slight resilient pressure against the inner edge of the sprocket-wheel 5. Plates, as indicated in Figs. 1 and 3, may be secured to the sides of the split ring $2^b$ to strengthen the ring at this place and hold the pawl $5^b$ in place.

$4^a$, Fig. 3, is a small spring secured to the disk $2^a$ and pressing upon the split ring $2^b$ in a direction toward the space $2^c$.

The operation of the device is as follows: The power applied to the pedals is conveyed immediately to the disk $2^a$, which is substantially integral with the crank-shaft, and from said disk the power is transmitted to the split ring $2^b$ through the pin $2^g$, links $2^f$, and the block $2^d$, said block bearing against one end of said ring. When the block $2^d$ is drawn forward by the links $2^f$, it strikes first at its inner end against the end of the split ring $2^b$ and is tilted so as to carry the lower end of the pawl 4 above the ratchet-teeth in the disk $3^a$, so that there shall be no contact between said pawl and said disk during the ordinary or forward operation of the bicycle. The action of the spring $4^a$ is to hold the ring $2^b$ and the disk $2^a$ in such relative position that the pawl 4 shall be in position to strike the teeth of the disk $3^a$. When the split ring $2^b$ is drawn forward by the action of the links $2^f$, its motion is communicated to the sprocket-wheel $5^a$, partly by the pawl $5^b$ and partly by the friction of said ring upon the inner edge of said wheel. When the pedals are held at rest, the sprocket-wheel $5^a$ turns freely upon the split ring $2^b$. However, its friction upon said ring will be sufficient to bring the end A of the split ring $2^b$ against the lower part of the adjacent edge of the block $2^d$, thus tilting said block in the direction that shall bring the lower end of the pawl 4 into a space between two of the teeth in the periphery of the disk $3^a$. If now a force is exerted tending to turn the crank-shaft backward, the motion is resisted by the inner end of the pawl 4 striking against one of the teeth of the stationary disk $3^a$. The force exerted against the inner end of the pawl 4 tends to turn the block $2^d$, and thus to spread the ends of the ring $2^b$ apart, tending to enlarge said ring and causing a frictional action of the periphery of said ring against the inner edge of the sprocket-wheel $5^a$, thus braking the bicycle.

What I claim is—

1. In a back-pedaling brake, the combination of a disk, $2^a$, secured to the crank-shaft, a split ring surrounding said disk, a sprocket-ring surrounding the split ring, a ratchet-disk fixed to the framework, and a pawl and ratchet arranged to interlock the split ring, and the sprocket-ring, a pawl, 4, linked to the disk, $2^a$, a block $2^d$, located between the ends of said split ring, the pawl, 4, being connected to said block, said block being actuated by the pawl, 4, engaging with said ratchet-disk, when back-pedaling, and the pawl, 4, said pawl being adapted to be lifted by said block actuated by the sprocket-ring, when front-pedaling, substantially as described.

2. In a back-pedaling brake, the combination of a pedal-driven plate, a sprocket-ring concentric therewith, an interposed split ring, a ratchet and pawl, said ratchet being secured to the bicycle-frame concentric with the pedal-shaft, said pawl being pivotally secured to a part revolving with the pedals, and means whereby the relative motion of said ring and pawl shall actuate said pawl to lift the same out of engagement with the ratchet, substantially as described.

3. In a back-pedaling brake in combination with a plate adapted to be driven by the crank-axle, a fixed ratchet, a sprocket-ring concentric with said plate, a split bearing-ring interposed between the sprocket-ring and said plate, a pawl, 4, a bearing for said pawl interposed between the ends of the split ring and linked to said plate, said bearing being so formed that it shall actuate said pawl in different directions when in contact with the different ends of said ring, and a clutching mechanism for binding said sprocket-ring to the pedal-shaft when driving forward, substantially as described.

4. In an attachment of the kind described, the combination of a plate adapted to be driven by the crank-axle, a sprocket-ring concentric therewith, an interposed split ring, a block between the ends of said ring, means whereby motion is communicated from said plate to said block, said block being adapted to turn and in so doing spread said ring, a stationary ratchet-disk, a pawl extending from said block and adapted to engage with the teeth of said ratchet-disk, said ratchet-disk being adapted to allow a forward but to prevent a backward motion of said pawl, and a clutching mechanism adapted to bind said sprocket-ring to the pedal-shaft when driving forward, substantially as described.

5. In an attachment of the kind described, the combination of a plate adapted to be driven by the crank-axle, a sprocket-ring concentric therewith, an interposed split ring, a block between the ends of said ring, means whereby motion is communicated from said plate to said block, said block being adapted to turn and in so doing to spread said ring, a stationary ratchet-disk, a pawl extending from said block, said block being so formed that contact with one of the ends of said ring shall cause said pawl to engage with said ratchet-disk, and contact with the other end of said ring shall force said pawl out of engagement with said ratchet-disk, and a clutching mechanism adapted to bind said sprocket-ring to said pedal-shaft when driving forward, substantially as described.

6. The combination of a sprocket-ring, 5, a disk, $2^a$, upon the crank-shaft, an interposed split ring, $2^b$, a block, $2^d$ located in the space between the ends of said ring, one or more links, $2^f$, connecting the plate, $2^a$, with the block, $2^d$, a stationary disk, $3^a$, provided with ratchet-teeth, a pawl, 4, extending from said block to engage the teeth of the disk, $3^a$, the teeth of the disk, $3^a$, being adapted to prevent a backward motion of the block, $2^d$, by striking against the pawl, 4, so as to turn said block, and a clutching mechanism adapted to bind said sprocket-ring to said pedal-shaft when driving forward, substantially as and for the purpose described.

7. The combination of a sprocket-ring, 5, a disk, $2^a$, upon the crank-shaft, an interposed split ring, $2^b$, a block, $2^d$ located in the space between the ends of said ring, said block being larger at one end than the other relative to the distance between the ends of said ring, one or more links, $2^f$, connecting the plate, $2^a$, with the block, $2^d$, a stationary disk, $3^a$, provided with teeth, a pawl extending inward from the block, $2^d$, in position to engage the teeth of the disk, $3^a$, when the block, $2^d$, is forced against one of the ends of the ring, $2^b$, and to clear said teeth when said block is forced against the other end of said ring, and a clutching mechanism adapted to bind said sprocket-ring to said pedal-shaft when driving forward, substantially as and for the purpose described.

In testimony whereof I sign this specification in the presence of two witnesses.

JOHN D. JACKSON.

Witnesses:
MAY E. KOTT,
JOHN N. GOODRICH.